UNITED STATES PATENT OFFICE.

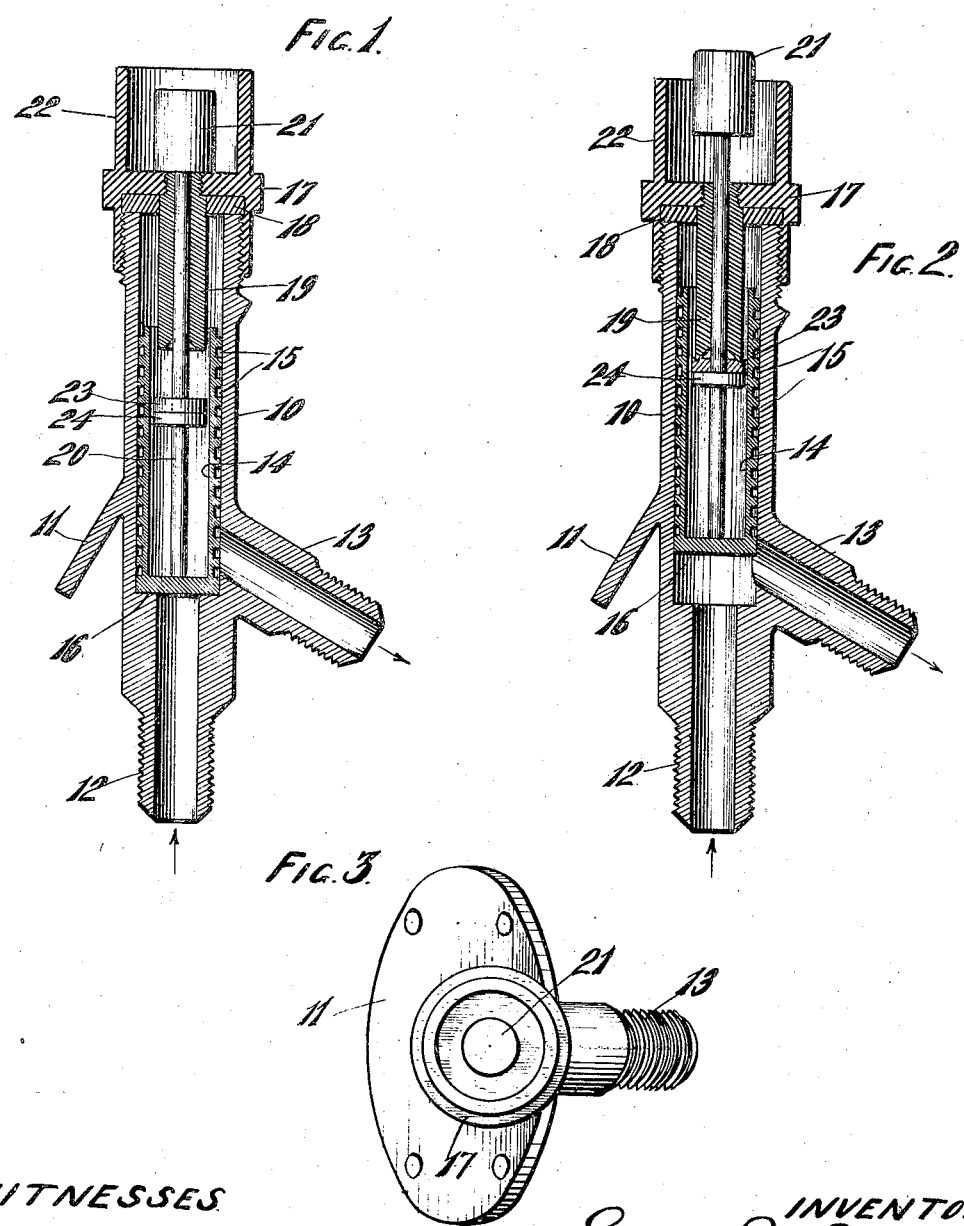

GEORGE W. MORRIS, OF RACINE, WISCONSIN.

INDICATOR FOR LUBRICATING SYSTEMS.

1,200,640.  Specification of Letters Patent.  Patented Oct. 10, 1916.

Application filed September 4, 1914. Serial No. 860,151.

*To all whom it may concern:*

Be it known that I, GEORGE W. MORRIS, a subject of the King of Great Britain, and resident of Racine, in the county of Racine and State of Wisconsin, have invented new and useful Improvements in Indicators for Lubricating Systems, of which the following is a description, reference being had to the accompanying drawings, which are a part of this specification.

This invention has for its object to provide means for indicating the failure of pressure in a lubricating system, such as the engine lubricating system of an automobile or the like, and consists of a plunger having a tendency to intercept the oil passageway leading from the oil pump but yielding to the pressure of the oil under the normal operation of the pump, so as to clear the oil passageway and exterior means movable with the plunger to indicate by its position the presence or absence of pressure in the lubricating system.

Another object of the invention is to provide such an indicator by which it may be determined in the dark as well as in the light whether the operating pressure is maintained in the lubricating system of an automobile engine, so that the need of lubricant when the lubricant supply is exhausted or the failure of the lubricant pump to perform its work properly will manifest itself and correction of the error may be made before serious trouble occurs from the continued running of the engine without lubricant.

With the above and other objects in view the invention consists in the indicator for lubricating systems as herein claimed and all equivalents.

Referring to the accompanying drawing in which like characters of reference indicate the same parts in different views: Figure 1 is a vertical sectional view of an indicator for lubricating systems exemplifying this invention, the parts being shown in the position indicating lack of pressure in the lubricating system. Fig. 2 is a similar view thereof with parts in the position assumed by them under the normal pressure of the lubricating system. Fig 3 is a plan view thereof.

In these drawings 10 indicates a tubular casing, preferably arranged vertically, as shown, with a face plate 11 at an angle thereto corresponding with the inclination of the dash board of the automobile or other part to which the indicator is to be attached, and 12 is a pump connection at the lower end of the casing adapted to be connected with a pipe leading from the lubricant pump, not shown, while 13 is a lubricant supply pipe connection leading from the casing and adapted for connection with a pipe for conveying the lubricant to the parts of the engine to be lubricated. A cylindrical plunger 14 with a closed lower end closely fits within the bore of the casing 10 and is preferably provided with a series of annular grooves 15 forming what is known as "water-packing" to prevent the lubricant passing upwardly between the plunger and the wall of the casing. The plunger in its lowermost position, as shown in Fig. 1, is seated on a shoulder 16 between the passageway of the pump connection 12 and the passageway of the lubricant supply pipe connection 13. In this position the plunger interrupts communication between these two passageways and is subject to the pressure of the lubricant pump so that when the pump is started in its operation by the starting of the engine the plunger is lifted to the position shown in Fig. 2, where it uncovers the passageway of pipe connection 13 and establishes communication between the two passageways.

A cap 17 is threaded on the upper end of the casing 10 with a gasket 18 therebetween and a tubular guide 19 projecting downward from the center of the cap into the upper end of the bore of the plunger has a stem 20 slidably fitting therein and bearing at its lower end against the closed portion of the plunger so as to partake of the movements of the plunger, there preferably being a knob or button 21 at the upper end of the stem above the cap 17 to indicate the position of the plunger. For convenience in readily determining the two positions of the knob 21 a cup shaped sleeve 22 is formed on the cap surrounding the knob and is of such height that in the lower position of the knob said knob lies beneath the upper edge of the sleeve while in the upper position of the knob it stands above the upper edge of the sleeve, thus permitting the position of the knob to be determined by feeling with the hand at night as well as by being seen in the day time. In order to further prevent leakage of pressure through the indicator the lower end of the guide 19 is preferably beveled to form a valve seat and a valve is formed on the stem 20 to engage therewith in the upper position of the plunger, such valve preferably consisting of a disk or washer 23 of leather or other suitable material supported by a flange 24 fixed on or formed with the stem 20. Thus, in the upper position of the plunger the valve 23 is held seated with pressure against the valve seat on the lower end of guide 19 preventing the escape of pressure around the stem and checking any tendency for the lubricant to be forced around the plunger and out through the guide opening for the stem.

By means of this invention a failure of the proper operation of the lubricating system, either through the faulty operation of the pump or by the exhaust of the supply of lubricant will be indicated by the dropping of the knob 21 which may be seen or felt, for under normal conditions the knob will remain in its upper position as shown in Fig. 2 whenever the engine is running and will return to its lower position as soon as the pressure on the lubricating system ceases.

During the operation of the pump the knob 21 remains in its upper position, as it does not have sufficient time to fall between the pulsations of the pump, and though it may move slightly with each pulsation of the pump owing to the reduction of pressure against the plunger 14 between the pump impulses it retains its projected position until the pressure in the passageway of the lubricating system ceases, either from the stopping of the engine or from the exhaustion of the supply of lubricant. The weight of the plunger and the stem and knob causes them to drop to their lower position whenever the pressure in the lubricant passageway is insufficient to support them.

What I claim as new and desire to secure by Letters Patent is:

1. An indicator for showing the existence of a normal flow of lubricant in the lubricating system of an automobile gas engine or the like, comprising a lubricant conductor forming part of the lubricating system through which the lubricant is normally forced under pressure, a plunger communicating with the interior of the lubricant conductor and subjected to the pressure of the lubricant flowing therethrough, and a visible stem on the plunger indicating the position thereof, said plunger and stem being adapted to fall in the absence of pressure in the conductor to a position in which the plunger intercepts the passageway through the conductor.

2. An indicator for showing the existence of a normal flow of lubricant through the lubricating system of an automobile gas engine or the like, comprising a lubricant conductor forming part of the lubricating system with the lubricant normally flowing therethrough under pressure, a cylindrical casing communicating with the lubricant conductor, a plunger fitting in the casing and subjected to the pressure of the lubricant flowing through the lubricant conductor, a stem on the plunger passing through an opening in the casing, a tubular guide in the casing for the stem, and a valve on the stem adapted to be seated on the end of the tubular guide for preventing loss of pressure therethrough when the plunger is in the position to which it is moved by the normal pressure within the lubricant conductor.

3. An indicator for lubricating systems, comprising a cylindrical casing, a plunger fitting therein, a pump connection having a passageway leading to the end of the casing, a lubricant supply pipe connection having a passageway leading to the side of the casing and closed against communication with the passageway of the pump connection by the plunger in one position thereof, said plunger being capable of movement from such position under the influence of the pressure of the lubricant admitted through the pump connection to establish communication between the said passageways, a stem passing through an opening in the casing and engaging the plunger to indicate the movements thereof, and a valve on the stem for sealing said opening in the casing against the loss of pressure therethrough.

4. An indicator for showing the existence of a normal flow of lubricant in the lubricating system of an automobile gas engine or the like, comprising a lubricant conductor forming a part of the lubricating system and having the lubricant normally flow therethrough under pressure, a cylindrical casing communicating with the lubricant conductor, a plunger fitting within the cylindrical casing and subjected to the pressure of the lubricant flowing through the lubricant conductor, a stem passing through an opening in the casing and moved by the plunger to indicate the position of the plunger, and a valve on the stem for sealing the opening of the casing, said plunger and stem being adapted to return to their original positions upon a reduction in pressure of the lubricant flowing through the lubricant conductor, the plunger moving to a position for intercepting the passageway through the lubricant conductor.

5. An indicator for showing the existence of a normal flow of lubricant in the lubricating system of an automobile gas engine or the like, comprising a lubricant conductor forming part of the lubricating system through which the lubricant is normally forced under pressure, a plunger communicating with the interior of the lubricant conductor and subjected to the pressure of the lubricant flowing through the lubricant conductor, and a visible stem on the plunger indicating the position thereof, said plunger and stem being adapted to fall in the absence of pressure in the conductor as when the supply of lubricant has become exhausted.

6. An indicator for lubricating systems comprising a cylindrical casing adapted to be secured to an automobile dash or the like and having a pump connection with a passageway leading to the end of the casing and having a lubricant supply pipe connection with a passageway leading from the side of the casing, a hollow plunger fitting within the casing with a closed end adapted to be seated between the two passageways, there being annular grooves around the plunger to prevent the leakage of the lubricant thereby, a cap threaded on the upper end of the casing, a tubular guide projecting from the cap into the hollow plunger, a stem passing through the tubular guide and bearing on the closed end of the plunger, a valve carried by the stem and adapted to be seated on the end of the tubular guide for preventing the leakage of pressure therethrough, a knob on the outer end of the stem, and a cup shaped projection on the cap surrounding the knob.

In testimony whereof, I affix my signature, in presence of two witnesses.

GEORGE W. MORRIS.

Witnesses:
F. H. FOSTER,
THOMAS WILLIAMS.